(12) United States Patent
Ringel et al.

(10) Patent No.: US 8,870,268 B2
(45) Date of Patent: Oct. 28, 2014

(54) MOTOR VEHICLE BODY

(71) Applicant: GM Global Technology Operations LLC, Detroit, MI (US)

(72) Inventors: Franz-Josef Ringel, Mainz (DE); Lothar Brod, Nauheim (DE); Gerald Heck, Nackenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/671,800

(22) Filed: Nov. 8, 2012

(65) Prior Publication Data

US 2013/0127206 A1    May 23, 2013

(30) Foreign Application Priority Data

Nov. 11, 2011    (DE) .......................... 10 2011 118 326

(51) Int. Cl.
*B62D 25/08* (2006.01)

(52) U.S. Cl.
USPC ...................... 296/187.04; 296/192

(58) Field of Classification Search
USPC ............................................. 296/192, 187.04
See application file for complete search history.

(56) References Cited

U.S. PATENT DOCUMENTS

| | | | |
|---|---|---|---|
| 6,224,143 B1* | 5/2001 | Koulchar et al. | 296/192 |
| 6,565,148 B1* | 5/2003 | Teramoto et al. | 296/192 |
| 2008/0211255 A1 | 9/2008 | Saito | |
| 2011/0068607 A1 | 3/2011 | Ott et al. | |

FOREIGN PATENT DOCUMENTS

| | | |
|---|---|---|
| DE | 102005027124 A1 | 12/2006 |
| DE | 102006029921 A1 | 1/2008 |
| DE | 102007012830 A1 | 9/2008 |
| DE | 102008019193 A1 | 10/2009 |
| DE | 102010005834 A1 | 7/2011 |
| EP | 0992418 A2 | 4/2000 |
| EP | 1829769 A1 | 9/2007 |
| JP | 2006111105 A | 4/2006 |
| JP | 2007331720 A | 12/2007 |
| JP | 2008137534 A | 6/2008 |
| JP | 2008247095 A | 10/2008 |
| WO | 03011658 A1 | 2/2003 |
| WO | 2010146306 A1 | 12/2010 |

OTHER PUBLICATIONS

German Patent Office, German Search Report for Application No. 102011118326.8, dated Jun. 18, 2012.
Search Report issued in GB Application No. 1219095.5 dated Feb. 15, 2013 (search date Feb. 14, 2013).

* cited by examiner

*Primary Examiner* — Dennis Pedder
(74) *Attorney, Agent, or Firm* — Ingrassia Fisher & Lorenz, P.C.

(57) ABSTRACT

A motor vehicle with a front opening hood and windshield ascending from a rear edge of the front opening hood is provided. The motor vehicle includes a cross member, whose front edge section supports a front lower edge of the windshield, and whose rear edge section abuts against a structural element of the body. A first side of the cross member faces the passenger cabin and a second side faces the engine compartment. The cross member is divided by slits into a plurality of webs spaced apart in the transverse direction of the body, and the slits are tightly sealed by a film.

10 Claims, 2 Drawing Sheets

MOTOR VEHICLE BODY

CROSS-REFERENCE TO RELATED APPLICATION

This application claims priority to German Patent Application No. 10 2011 118 326.8, filed Nov. 11, 2011, which is incorporated herein by reference in its entirety.

TECHNICAL FIELD

The technical field relates to a motor vehicle body with a front opening hood, a windshield ascending from a rear edge of the front opening hood, and a cross member that supports a front lower edge of the windshield.

BACKGROUND

Known from DE 10 2007 012 830 A1 is a motor vehicle in which a cross member that supports the windshield is composed of two supporting structures joined to each other at their front and rear edges. The upper supporting structure has an upwardly curved cross section, with a front section that supports the front edge of the windshield and ascends opposite the traveling direction, a substantially horizontal middle section and a rear section that drops off sharply opposite the traveling direction. The upper supporting structure is divided into a plurality of webs by slits spaced apart from each other in the transverse direction of the vehicle. These slits prevent a deformation of the upper supporting structure that results from a head impact from spreading in the transverse direction of the vehicle, and may prevent regions of the cross member that were not directly affected by the head from deforming.

The slits each have front and rear ends, wherein the front ends lie deeper than the rear ends, and the curved webs running between them form a convex curvature facing the impacting head. Generally, this arrangement may be effective if the head impacts at the height of the convex curvature. In addition, the deformation trajectory on which the webs are effective may be short; as soon as the latter have assumed a concave curvature under the pressure of the impacting head, the force of impact is absorbed by regions of the cross member. In one example, if the point of impact lies in front of the curvature, the head, may contact a front edge of the upper supporting structure, which is reinforced even further by a lower supporting structure secured thereto. While it would essentially be conceivable to omit the lower supporting structure or also weaken it with slits, it would then no longer be possible to provide a sound-absorbing and odor-proof separation between the engine compartment on the one hand and the driver's cabin on the other, which would be pose a constant nuisance to the passengers in the vehicle.

Therefore, it may be desirable to provide a motor vehicle body in which a cross member that supports a front lower edge of the windshield ensures both a satisfactory separation between the engine compartment and passenger cabin, and an effective pedestrian protection. In addition, other objects, desirable features and characteristics will become apparent from the subsequent summary and detailed description, and the appended claims, taken in conjunction with the accompanying drawings and this background.

SUMMARY

According to various exemplary embodiments, provided is a motor vehicle body with a front opening hood, a windshield that ascends from the rear wall of the front opening hood, and a cross member, whose front edge section supports a front lower edge of the windshield and whose rear edge section abuts against a structural element of the body, and whose first side faces the passenger cabin and whose second side faces the engine compartment, and which is divided by slits into a plurality of webs spaced apart in the transverse direction of the body, by virtue of the fact that the slits are tightly sealed by a film.

To simplify production, a single film can seal a plurality of the slits, generally all of the slits. The film can be adhesively bonded to the webs in order to securely anchor them thereto.

Since the film ensures an odor-proof and sound-absorbing separation between the engine compartment and passenger cabin, no other fixtures that unnecessarily increase body stiffness are needed for separating the passenger cabin and engine compartment. Therefore, it is enough for the cross member to be comprised of a single layer of flat material, in one example, a sheet metal.

The cross member is generally also designed as a single piece.

In one example, the webs can be joined together as a single piece at least at one of their ends via one of the edge sections of the cross member, and they are generally joined together at both ends.

According to the present disclosure, in one exemplary embodiment, the front ends of the webs can be higher than the rear ends. This allows the webs to yield to the impact of a head, which generally happens at an inclination from the front and above, in that the ends of a web exposed to the impact converge toward each other. Therefore, the path over which a deformation of the cross member continuously slows the impact of a head at a comparatively low deceleration can be made nearly identical to the original distance between the ends of the webs, and hence almost as long as the webs themselves.

To facilitate a yielding by the webs under a load, the latter are generally curved.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
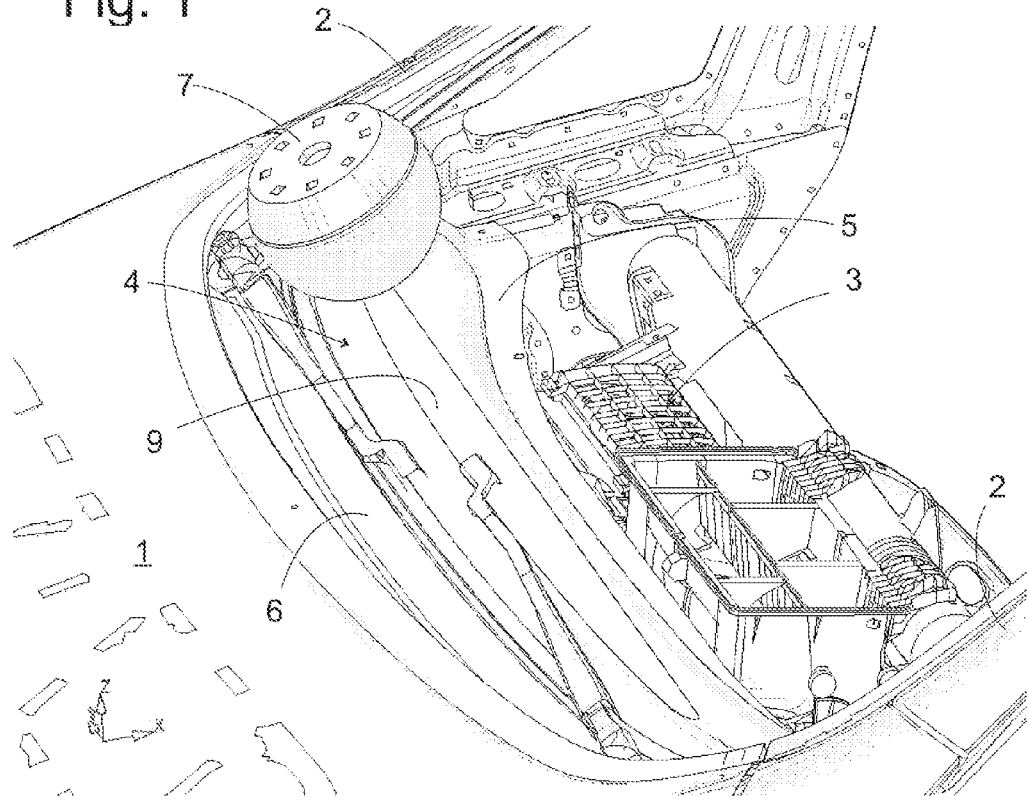
FIG. 1 is a perspective view of part of a motor vehicle body according to the various teachings of the present disclosure and an impactor that simulates the impact of the head of a pedestrian.

FIG. 1 shows a perspective view of part of a motor vehicle body to which the present disclosure can be applied. The rear area of a front opening hood 1 is visible, as is a window opening adjoining the latter, which accommodates a windshield in the finished vehicle, flanked by A-columns 2. A dashboard paneling has been omitted on FIG. 1, so as to reveal fixtures 3 of the dashboard lying underneath, as well as a cross member 4 formed out of a single ply sheet metal blank, which are concealed under the dashboard paneling in a finished vehicle. A rear edge 5 of the cross member 4 abuts against the upper edge of a separating wall, which extends between the passenger cabin and engine compartment. A front edge 6 of the cross member 4 supports a front lower edge of the windshield.

An impactor 7 depicted above the cross member 4 shows the position where, when the vehicle collides with an adult pedestrian of normal height, and he or she hits the front opening hood 1, his or her head strikes the car body. The impact site is located in a lower region of the windshield above the cross member 4.

Figure 2:
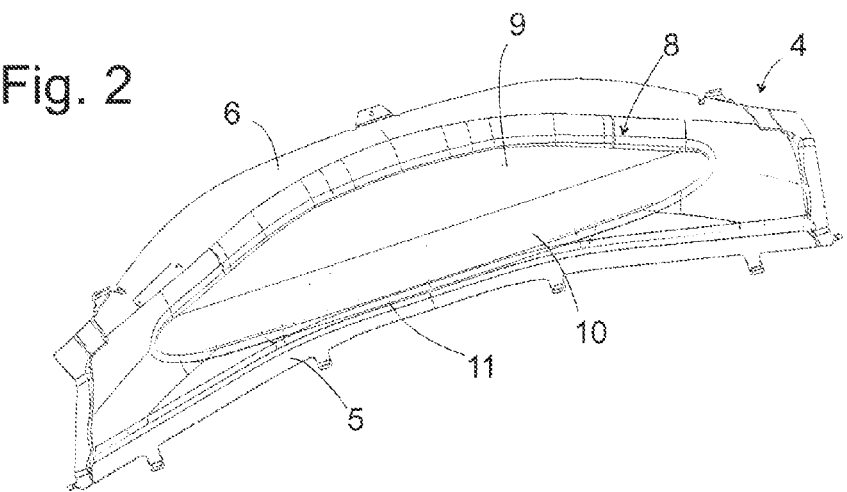
FIG. 2 is a perspective view of the cross member according to the various teachings of the present disclosure with adhesively bonded film.
Figure 4:
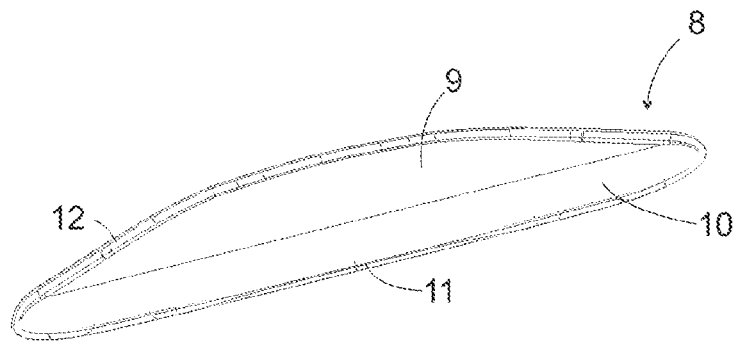
FIG. 4 is the film molded to fit the cross member.

In a perspective view corresponding roughly to the vantage point of a driver seated in the vehicle, FIG. 2 shows the cross member 4 and a plastic film 8 adhesively bonded thereto in a central region of the cross member 4. The film 8 can be limp; it is easier to handle when it exhibits thin walls, but enough inherent stiffness to maintain the shape depicted on FIG. 4, even when separate from the cross member 4. The film 8 generally deep drawn in the shape depicted encompasses a flat upper section 9 that is substantially horizontal and also visible on FIG. 1, a rear edge 10 that faces the driver and exhibits a curve with a large radius, a lower section 11 that is nearly parallel to the viewing direction on FIG. 4, and hence barely visible, and slopes steeply toward the front in the longitudinal direction of the vehicle, as well as a continuous edge region 12 that is angled against the sections 9 and 11 and the rear edge 10.

Figure 3:
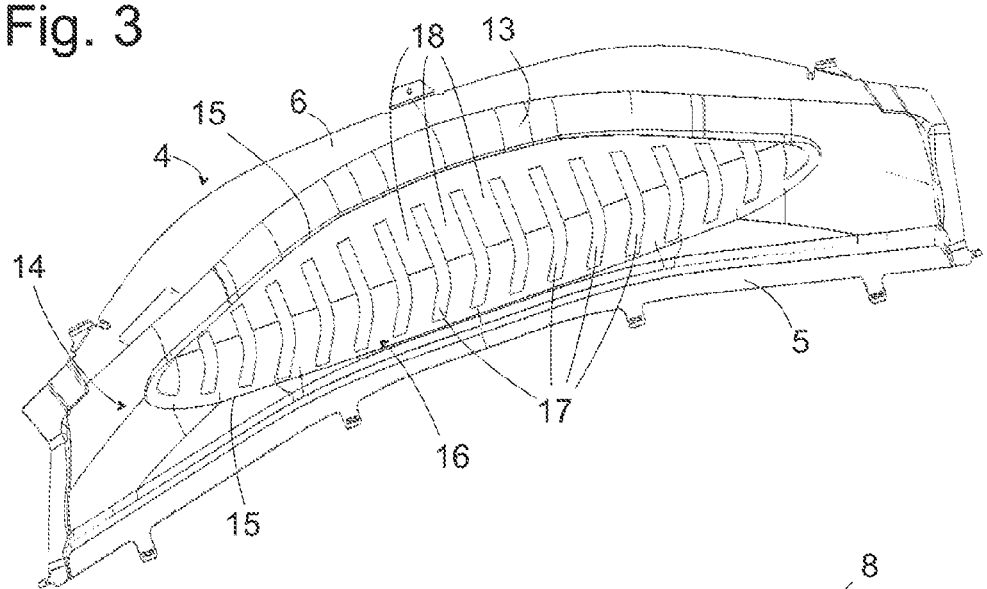
FIG. 3 is the cross member without film.

The cross member 4 formed out of a single sheet metal blank is shown on FIG. 3 by itself in a perspective view. Its front edge 6 is arc-shaped and slopes steeply toward the front as viewed from the top, and shaped to flatly support the windshield on its lower edge. The rear edge 5 is also arc-shaped as viewed from the top, provided for attachment to a separating wall between the engine compartment and passenger cabin, and situated at a lower level than the front edge 6 in the built-in state. On average, a central region 14 of the cross member 4 between the edges 5, 6 slopes to the back at a steep inclination from the windshield toward the separating wall. Situated between the central region 14 and front edge 6 is a transitional zone 13 that is convexly curved with a large radius toward the passenger cabin. Bordered by a flat, oval or lenticular buckling line 15, a salient region 16 relative to the passenger cabin forms in the central region 14, and is divided into webs 18 spaced apart in the widthwise direction of the vehicle by a plurality of slits 17. In the assembled state depicted on FIG. 2, the plastic film 8 covers the entire salient region 16, up to and including the buckling line 15, and projecting slightly beyond that. The film 8 is adhesively bonded to the entire surface of the cross member 4.

Figure 5:
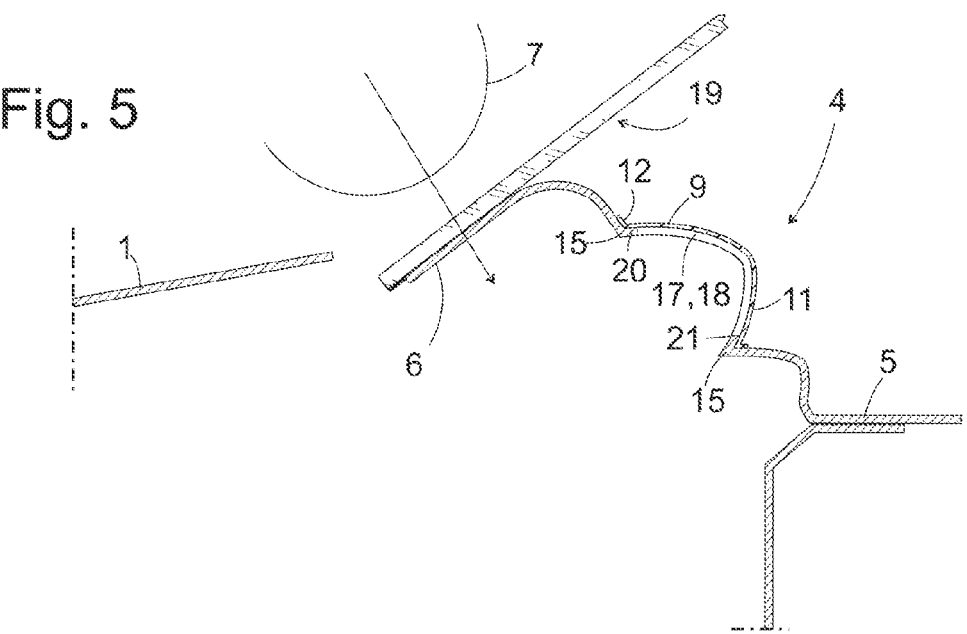
FIG. 5 is a schematic cross section through the cross member and its environment immediately prior to an impact.

If a head or impactor 7 strikes the front edge 6 of the cross member 4 adhesively bonded with the windshield here marked 19 as depicted on FIG. 5, the edge 6 and transitional zone 13 can locally yield, wherein substantially only those webs 18 situated directly under the point of impact of the impactor 7 become clinched. The webs 18 yield relatively easily by comparison to a similarly thick sheet metal that has not been pierced, since the slits 17 allow the webs 18 to yield in response to clinching not just by virtue of the ends 20, 21 of the webs 18 moving toward each other, but also as the result of significantly smaller movements in a transverse direction, without these movements leading to extensive deformations even laterally from the immediate area of impact of the impactor 7. While the overall loading capacity of the cross member 4 with which the latter supports a locally uniformly distributed load, such as that of the windshield 19, is only slightly diminished by the slits 17; the local yielding capacity that is pivotal for protecting the pedestrian is distinctly improved. Since the film 8 is very easy to deform by comparison to the salient region 16 of the cross member 4 it covers, it has no noticeable influence on the stiffness of the cross member 4, but is effective in muffling the transmission of noise from the engine compartment into the passenger cabin, and keeping unpleasant odors out of the passenger cabin.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle body, comprising:
a front opening hood;
a windshield ascending from a rear edge of the front opening hood;
a cross member including a front edge section that supports a front lower edge of the windshield, a rear edge section that abuts against a structural element of the motor vehicle body, a first side that faces a passenger cabin of the motor vehicle body and a second side that faces an engine compartment of the motor vehicle body, the cross member divided by slits into a plurality of webs spaced apart in the transverse direction of the motor vehicle body; and
a film that tightly seals the slits.

2. The motor vehicle body according to claim 1, wherein a single film seals a plurality of the slits.

3. The motor vehicle body according to claim 1, wherein the film is adhesively bonded to the plurality of webs.

4. The motor vehicle body according to claim 1, wherein the cross member is a single layer of flat material.

5. The motor vehicle body according to claim 1, wherein the cross member is composed of a sheet metal.

6. The motor vehicle body according to claim 1, wherein the cross member is designed as a single piece.

7. The motor vehicle body according to claim 1, wherein the plurality of webs are joined together as a single piece at least at one of their ends via one of the front edge section and rear edge section.

8. The motor vehicle body according to claim 1, wherein each of the plurality of webs has a front end and a rear end, and the front ends are higher than the rear ends.

9. The motor vehicle body according to claim 1, wherein each one of the plurality of webs are curved.

10. A motor vehicle, comprising:
a body that defines a passenger cabin and an engine compartment;
a front opening hood;
a windshield ascending from a rear edge of the front opening hood;
a cross member including a front edge section that supports a front lower edge of the windshield, a rear edge section that abuts against a structural element of the body, a first side that faces the passenger cabin and a second side that faces the engine compartment, the cross member divided by slits into a plurality of webs spaced apart in the transverse direction of the body; and
a film that tightly seals the slits,
wherein each of the plurality of webs has a front end and a rear end, and the front ends are higher than the rear ends.

* * * * *